us006895223B2

(12) United States Patent
Murakami

(10) Patent No.: US 6,895,223 B2
(45) Date of Patent: May 17, 2005

(54) MOBILE COMMUNICATIONS SYSTEM AND OPERATION METHOD THEREOF

(75) Inventor: Takuya Murakami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/740,433

(22) Filed: Dec. 22, 2003

(65) Prior Publication Data

US 2004/0132484 A1 Jul. 8, 2004

Related U.S. Application Data

(62) Division of application No. 09/790,505, filed on Feb. 23, 2001.

(30) Foreign Application Priority Data

Feb. 28, 2000 (JP) .......................... 2000-052537

(51) Int. Cl.⁷ .......................... H04B 17/00; H04M 1/66; H04M 1/68; H04M 3/16; H04Q 7/20
(52) U.S. Cl. .................. 455/67.11; 455/411; 455/456.6
(58) Field of Search .......................... 455/67.11, 456.6, 455/457, 411, 565; 342/357.07

(56) References Cited

U.S. PATENT DOCUMENTS 5,659,595 A 8/1997 Chanu et al.
6,011,973 A 1/2000 Valentine et al.

FOREIGN PATENT DOCUMENTS

| JP | 7-193865 | 7/1995 |
| JP | 8-102785 | 4/1996 |
| JP | 9-191342 | 7/1997 |
| JP | 10-23503 | 1/1998 |
| JP | 10-56449 | 2/1998 |
| JP | 10-222426 | 8/1998 |
| JP | 11-224236 | 8/1999 |
| JP | 11-338826 | 12/1999 |
| WO | 99/24938 | 5/1999 |

Primary Examiner—William D. Cumming
(74) Attorney, Agent, or Firm—Young & Thompson

(57) ABSTRACT

A mobile communication system including a fixed station, a detection unit, and mobile terminals, which provides a wireless communication for the mobile terminals. The detection unit detects a utilization condition indicative of a state where the mobile terminals are being used. The fixed station contains a storage unit that stores a utilization-admission condition indicative of a state where said mobile terminals are permitted to be used, and a processing unit for executing communications with the mobile terminals. The processing unit therefore halts communications with the mobile terminals in accordance with the utilization condition and utilization-admission condition.

11 Claims, 7 Drawing Sheets

MOBILE COMMUNICATIONS SYSTEM AND OPERATION METHOD THEREOF

CROSS REFERENCE TO RELATED APPLICATIONS

This application is a division of co-pending application Ser. No. 09/790,505, filed on Feb. 23, 2001, the entire contents of which are hereby incorporated by reference

BACKGROUND OF THE INVENTION

The present invention relates to a mobile communications system and an operation method thereof. More particularly, the present invention relates to a mobile communications system and a method of operating the system for preventing fraudulent use of communication terminals.

Recently, mobile communication terminals (cellular phones) are increasing in demand. These terminals, once lost by the user or stolen by someone else, are liable to fraudulent use by the third party.

Japanese laid-open patent application 9-191342 discloses a mobile telephone system capable of preventing fraudulent use of mobile terminals. The system comprises as shown in FIG. 7, a mobile telephone terminal 101, a location registration terminal 102, switches 103, and a network services control point (hereinafter referred to as NSP) 104.

The mobile telephone terminal 101 and location registration terminal 102 include location registration means 105 and 106, respectively. The location registration means 105 and 106 request for a location registration to the NSP 104. The location registration terminal 102 further includes a termination means 107.

The switches 103 are accommodating the mobile telephone terminal 101 and location registration terminal 102. The NSP 104 controls and administers the switches 103. The NSP 104 includes a means 108 for storing a location information of the mobile telephone terminal, a means 109 for storing a location information of the location registration terminal, a means 110 for up-dating a location-registration information, a means 111 for supervising the up-date of location information, a collation means 112, a message informing means 113, a message/location information informing means 114, an outgoing-call halting means 115, a means 116 for releasing the halt of an outgoing-call, a means 117 for supervising the registration of location information, a theft registration means 118, a theft supervising means 119, a subscriber-data storing means 120, and a maintenance terminal 121. The subscriber-data storing means 120 stores an outgoing-call halting state 122 and a theft-registration state 123.

Means 110 for up-dating a location-registration information up-dates the location-registration information. Means 111 for supervising the up-date of location information activates the location information upon completion of the up-date of each location information. The collation means 112 detects the difference of each location information, and the message informing means 113 informs a maintenance personnel of a message.

In the prior art mobile telephone system as described above, the mobile telephone terminal 101 and location registration terminal 102 transmit to the NSP 104 respective location information. The location information of the terminal 101 is registered in the means 108 for storing a location information of the mobile telephone terminal, by the means 110 for up-dating a location-registration information, so that the location information is up-dated. The location information of the location registration terminal 102 is also registered in the means 109 for storing a location information of the location registration terminal, by the means 110 for up-dating a location-registration information, so that the location information is up-dated.

When the means 110 for up-dating a location-registration information registers and up-dates the location information of the mobile telephone terminal 101 and location registration terminal 102, it is determined as to whether the theft-registration state 123 is set. If the theft-registration state 123 is not set, the location information of the mobile telephone terminal 101 and that of the location registration terminal 102 are matched by the collation means 112.

As a result of the collation, if the location information of the mobile telephone terminal 101 and that of the location registration terminal 102 are not matched, an out-going call from the terminal 101 is halted and restricted. Successively, the location registration terminal 102 is informed of the fact that the terminal may have been stolen or the user may have lost it.

On the other hand, if the theft-registration state 123 is set, the maintenance terminal 121 and the location registration terminal 102 are given notice of the fact that the mobile telephone terminal 101 has probably been stolen or the user has possibly lost it.

In the prior art communication system, an out-going call from the mobile telephone terminal 101 is halted, if the location information of the terminal 101 and that of the location registration terminal 102 are not matched. However, even no match is found between the location information of the terminal 101 and that of the terminal 102, there is a possibility that the terminal 101 is not fraudulently used. Furthermore, there is also a possibility that the terminal 101 is fraudulently used even in a case where match is found between the location information of the terminal 101 and that of the terminal 102.

It is therefore desirable that, in the mobile communication system, the mobile terminal is completely prevented from fraudulent use. In addition, it is also desirable that the mobile communication system is capable of detecting the location of the lost or stolen terminals.

SUMMARY OF THE INVENTION

In view of the foregoing problem, it is an object of the present invention to provide a mobile communication system capable of preventing fraudulent use of the mobile terminal. Another object of the present invention is to provide a mobile communication system that can detect the location of the lost or stolen communication terminals.

According to the present invention, there is provided a mobile communication system including a fixed station and mobile terminals, for providing a wireless communication for the mobile terminals, comprising a first detection means for detecting a utilization condition indicative of a state where said mobile terminals are being used; a storage means for storing a utilization-admission condition indicative of a state where said mobile terminals are permitted to be used; and processing means for executing communications with said mobile terminals, wherein said fixed station contains said storage means and processing means, and wherein said processing means halts said communications with said mobile terminals in accordance with said utilization condition and utilization-admission condition. It is preferable that said utilization-admission condition includes a condition where said mobile terminals are prohibited from usage.

Preferably, the mobile communication system according to the present invention, wherein said first detection means includes a second detection means for detecting a first location where said mobile terminals exist, said first location being included in said utilization condition and said utilization-admission condition including a second location where said mobile terminals are permitted to be used.

It is preferable that the mobile communication system according to the present invention, wherein said first detection means includes a fourth detection means for detecting a user attribute associated with user of said mobile terminals, said user attribute being included in said utilization condition, and said utilization-admission condition including attribute of the user who is permitted to use said mobile terminals.

It is also preferable that the mobile communication system according to the present invention, wherein said mobile terminals include a break-down means for breaking down the functions of said mobile terminals, and wherein said processing means determines by referring to said utilization condition and utilization-admission condition, whether said utilization condition indicates that said mobile terminals are permitted to be used, and said processing means issues a signal indicative of fraudulent use, to said mobile terminals depending upon said determination result, said break-down means breaking down the functions of said mobile terminals in response to said signal so that said mobile terminals become unable to communicate with said processing means.

A mobile terminal, in accordance with the present invention, comprises a communication means for communicating with a fixed station; and a first detection means for detecting a utilization condition indicative of a state of said mobile terminal that is being used, wherein said communication means transmits said utilization condition to said fixed station.

Preferably, the mobile terminal according to the present invention, wherein said first detection means includes a second detection means for detecting a terminal location where said mobile terminal exists, said terminal location being included in said utilization condition.

It is preferable that the mobile terminal according to the present invention, wherein said first detection means includes a third detection means for detecting attribute of a user who uses said mobile terminal, said attribute being included in said utilization condition.

It is also preferable that the mobile terminal according to the present invention, further comprising a break-down means for breaking down the functions of said mobile terminal, wherein said communication means receives a signal from said fixed station, and wherein said break-down means breaks down the functions of said communication means in response to said signal.

A fixed station used for a mobile communication system, in accordance with the present invention, comprises processing means for executing communications with mobile terminals, and a storage means for storing a utilization-admission condition indicative of a state where said mobile terminals are permitted to be used, wherein said processing means halts said communications with said mobile terminals, in accordance with a utilization condition indicative of a state where said mobile terminals are being used, and with said utilization-admission condition.

Preferably, the fixed station of the present invention, wherein said utilization condition includes a first location where said mobile terminals exist, and said utilization-admission condition includes a second location where said mobile terminals are permitted to be used.

It is preferable that the fixed station according to the present invention, wherein said utilization condition includes a user attribute associated with user of said mobile terminals, and said utilization-admission condition includes attribute of the user who is permitted to use said mobile terminals.

It is preferable that the fixed station of the present invention, wherein said processing means determines by referring to said utilization condition and utilization-admission condition, whether said utilization condition indicates that said mobile terminals are permitted to be used, and said processing means issues a signal indicative of fraudulent use, to said mobile terminals depending upon said determination result.

The present invention is also an operation method of a mobile communication system which comprises a step of communicating with mobile terminals; a step of detecting a utilization condition indicative of a state where said mobile terminals are being used; and a step of halting said communications with said mobile terminals in accordance with said utilization condition, and with a utilization-admission condition indicative of a state where said mobile terminals are permitted to be used.

Preferably, the operation method of the present invention further comprises a step of determining by referring to said utilization condition and utilization-admission condition, whether said utilization condition indicates that said mobile terminals are permitted to be used; a step of sending a signal indicative of fraudulent use, to said mobile terminals depending upon said determination result; and a step of breaking down the functions of said mobile terminals in response to said signal.

It is also preferable that the operation method according to the present invention, further comprising a step of selecting from among a plurality of base stations a base station that communicates with said mobile terminals, as a location-detection base station; and a step of deciding the location of said location-detection base station to be a location where said mobile terminals exist.

DESCRIPTION OF THE PREFERRED EMBODIMENTS

Figure 1:
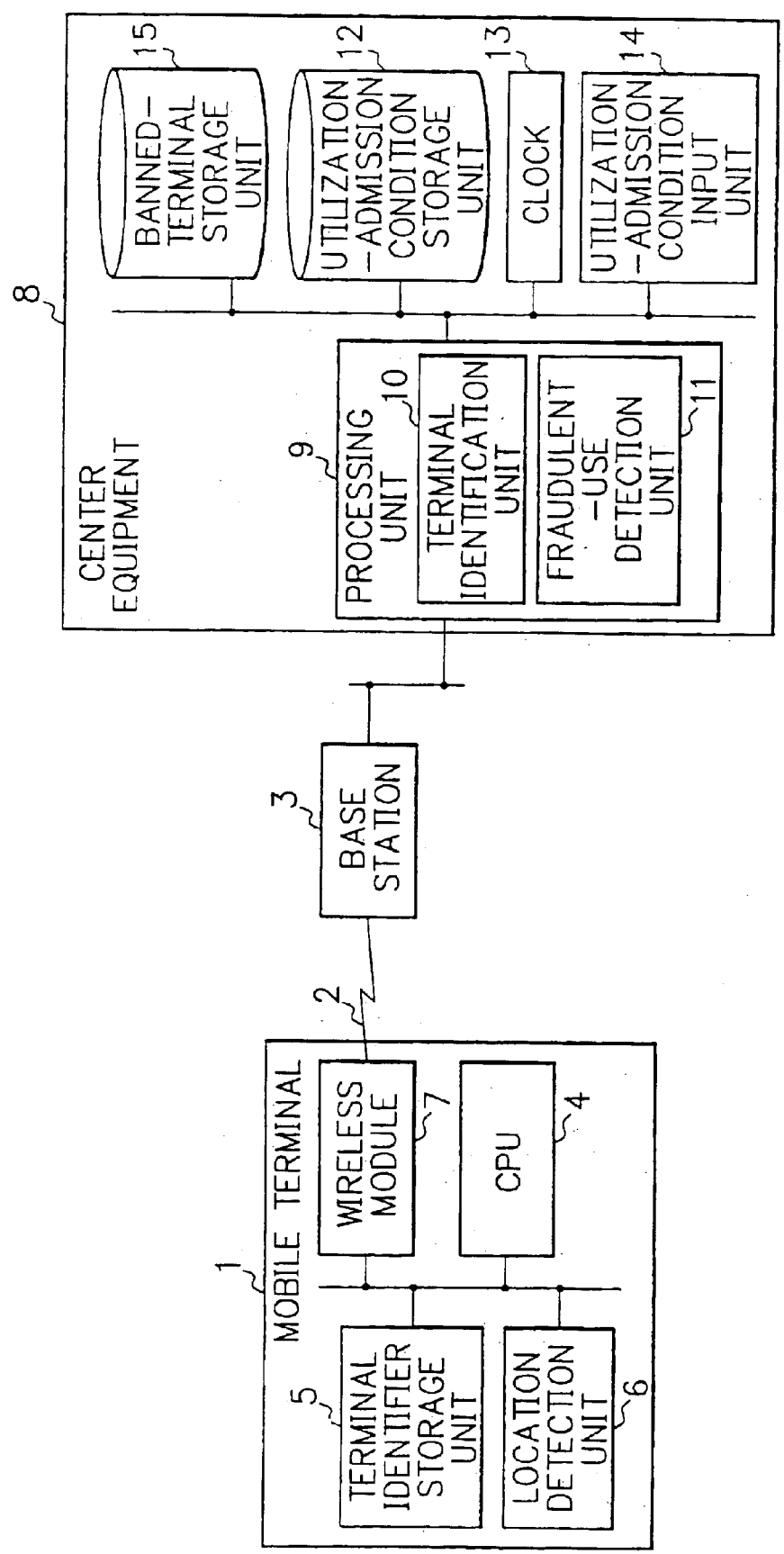
FIG. 1 is a block diagram showing a configuration of a mobile communication system according to a first embodiment of the present invention.

First Embodiment:

FIG. 1 is a block diagram of a mobile communication system according to a first embodiment of the present invention. The mobile communication system has both a mobile terminal 1 and a base station 3, where the mobile terminal 1 is connected to the base station 3 via a wireless communication network 2 as shown in FIG. 1.

The mobile terminal 1 includes a central processing unit (hereinafter abbreviated as a CPU). The CPU 4 is connected to a terminal-identifier storage unit 5 that stores terminal identifiers. The storage unit 5 holds identifiers which are peculiar to individual terminals.

The CPU 4 is also connected to a location detection unit 6 that detects the location of the mobile terminal 1. Preferably, the location detection unit 6 consists of a GPS (Global Positioning System) antenna. Wireless module 7 to which the CPU 4 is connected is linked to the base station 3 via the wireless communication network 2. The base station 3 is connected to a center equipment 8 which includes a processing unit 9. The processing unit 9 is linked to the base station 3.

The processing unit 9 includes a terminal identification unit 10 and a fraudulent-use detection unit 11. The unit 9 is internally connected to a utilization-admission condition storage unit 12 that stores conditions of usage permitted to each mobile terminal 1. Information indicative of these conditions with respect to utilization condition of each mobile terminal is hereinafter referred to as a utilization-admission condition information.

The processing unit 9 is further connected to a clock unit 13, to a utilization-admission condition input unit 14, and to a banned-terminal storage unit 15. This unit 15 stores a banned-terminal information including a terminal identifier of the mobile terminal 1 to be banned a usage. The mobile terminal 1 that has a terminal identifier identical with one contained in the banned-terminal information is prohibited from a communication service.

In the mobile communication system according to the first embodiment, prior to the mobile terminal 1 is used, the utilization-admission condition information is output from the utilization-admission condition input unit 14, which is then stored in the utilization-admission condition storage unit 12. This information includes a time-slot information and a location information. The time-slot information is information indicating a time slot in which each mobile terminal is permitted to be used. The location information is indicative of the location where usage of each mobile terminal is permitted.

The time-slot information and location information may have a correlation with each other. More specifically, the time-slot information and location information have contents in which each mobile terminal is permitted to be used in a first time slot in a first location and is permitted to be used in a second time slot in a second location. A terminal identifier stored in the terminal-identifier storage unit 5 of each mobile terminal is attached to the utilization-admission condition information of the terminal 1.

Figure 2:
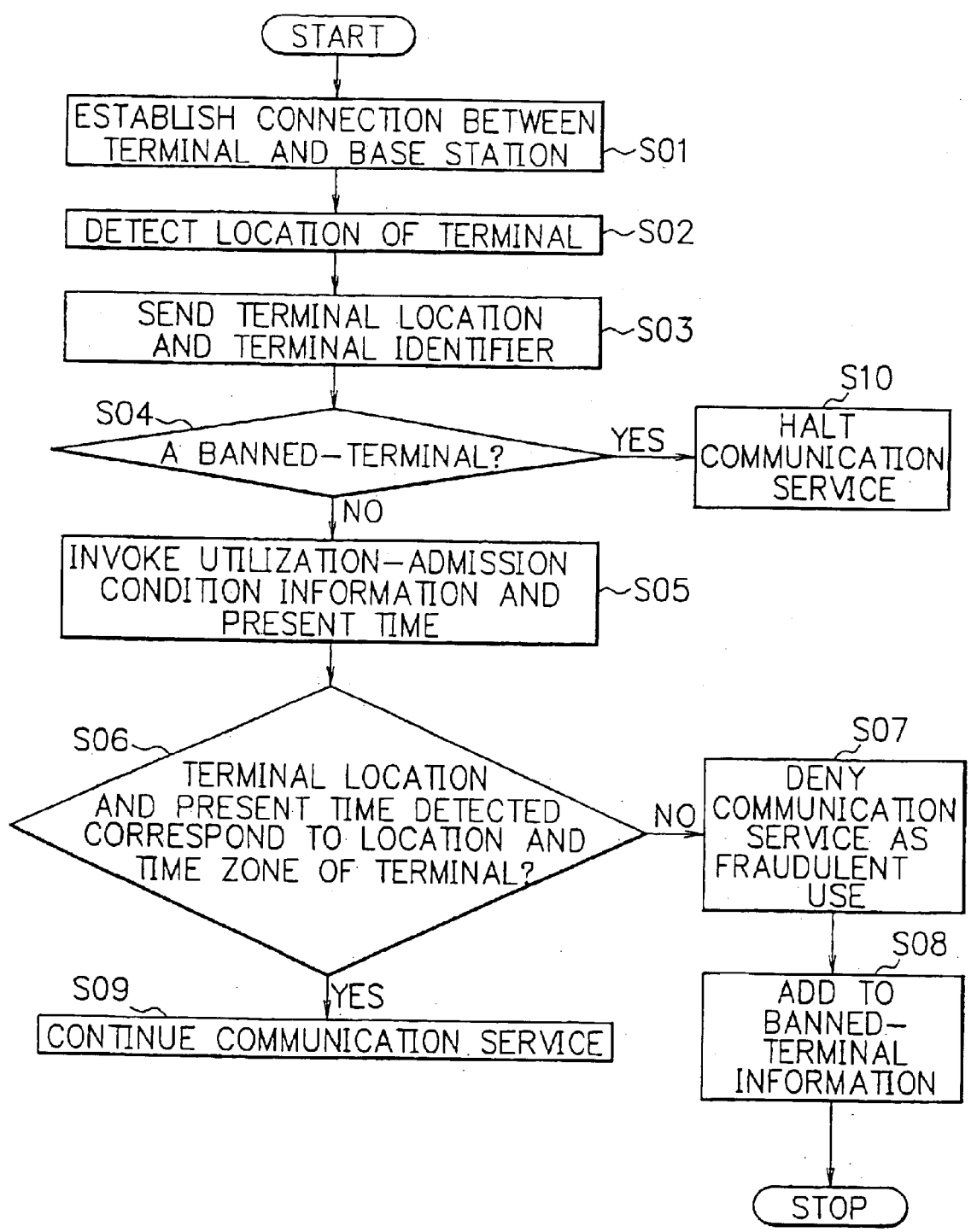
FIG. 2 is a flowchart illustrating the operation of a mobile communication system according to a first embodiment.

FIG. 2 is a flowchart showing the operation of the mobile communication system according to the first embodiment, when each mobile terminal is used. Description is made by separating the operation into steps S1 to S10.

In step S1, a terminal user starts using the mobile terminal 1 and a connection is established between the terminal 1 and the base station 3. The processing then goes to step S2. In step S2, the location detection unit 6 detects the location where the mobile terminal 1 exists. This location is hereinafter referred to as a terminal location. The unit 6 detects the terminal location by using the GPS antenna.

In step S3, the terminal location and terminal identifier are sent to the center equipment 8 via the wireless communication network 2 and base station 3. The terminal identifier is stored in advance in the terminal-identifier storage unit 5 of the mobile terminal 1.

In step S4, the processing unit 9 performs collation between a terminal identifier sent from the mobile terminal 1 and a terminal identifier contained in the banned-terminal information stored in the banned-terminal storage unit 15. If the terminal identifier from the mobile terminal 1 matches a terminal identifier contained in the banned-terminal information, a communication service to the terminal 1 is halted in step S10. If not, the processing goes from step S4 to step 5.

The processing unit 9 of the center equipment 8 invokes in step S5, a utilization-admission condition information of the mobile terminal 1 from the utilization-admission condition storage unit 12, by using the terminal identifier from the mobile terminal 1. The unit 9 also invokes the present time from the clock unit 13.

The fraudulent use detection unit 11 included in the processing unit 9 makes inquiries in step S6, about a utilization-admission condition information of the mobile terminal 1, the location of the terminal sent from the mobile terminal 1, and the present time. If the location of the mobile terminal 1 and the present time do not respectively correspond to the location where the terminal is permitted to be used and the time slot in which the terminal is allowed to be used, as indicated in the utilization-admission condition information, the processing goes to step S7.

In step 7, it is determined by the fraudulent use detection unit 11 that the mobile terminal 1 is being fraudulently used. The processing unit 9 then forcibly stops or denies providing the terminal 1 with a communication service. In the next step, step S8, the processing unit 9 adds, if required, to a banned-terminal information stored in the banned-terminal storage unit 15 a terminal identifier of the terminal 1 that has been determined to be fraudulently used. After that, the terminal 1 that has been determined to be fraudulently used is prohibited from a usage.

If, on the other hand, the location of the mobile terminal 1 and the present time respectively correspond to the location where the terminal is permitted to be used and the time slot in which the terminal is allowed to be used, as indicated in the utilization-admission condition information, the processing goes to step S9, where the processing unit 9 performs continuation of a communication service with the mobile terminal 1.

Processings as shown in steps 1 to 10 are stored in a storage medium (not shown) as computer readable program codes. The mobile communication system according to the first embodiment executes the processing in conformity with these program codes.

It should be noted that in this embodiment the utilization-admission condition information can have only a location information. In this case, the fraudulent use detection unit 11 performs collation between the location of the mobile terminal sent from the terminal 1 and the location information included in the utilization-admission condition information, thus determining whether the terminal is being fraudulently used.

Moreover, the center equipment 8 can be configured to exclude the banned-terminal storage unit 15. With this configuration, steps 5 and 8 are not executed.

In the present embodiment, the utilization-admission condition information may store a condition where the mobile terminal 1 is prohibited from usage. In this case, it is determined in the step 6 that the mobile terminal 1 is being fraudulently used if the usage condition of the terminal 1 corresponds to the condition where the mobile terminal 1 is prohibited from usage.

Figure 3:
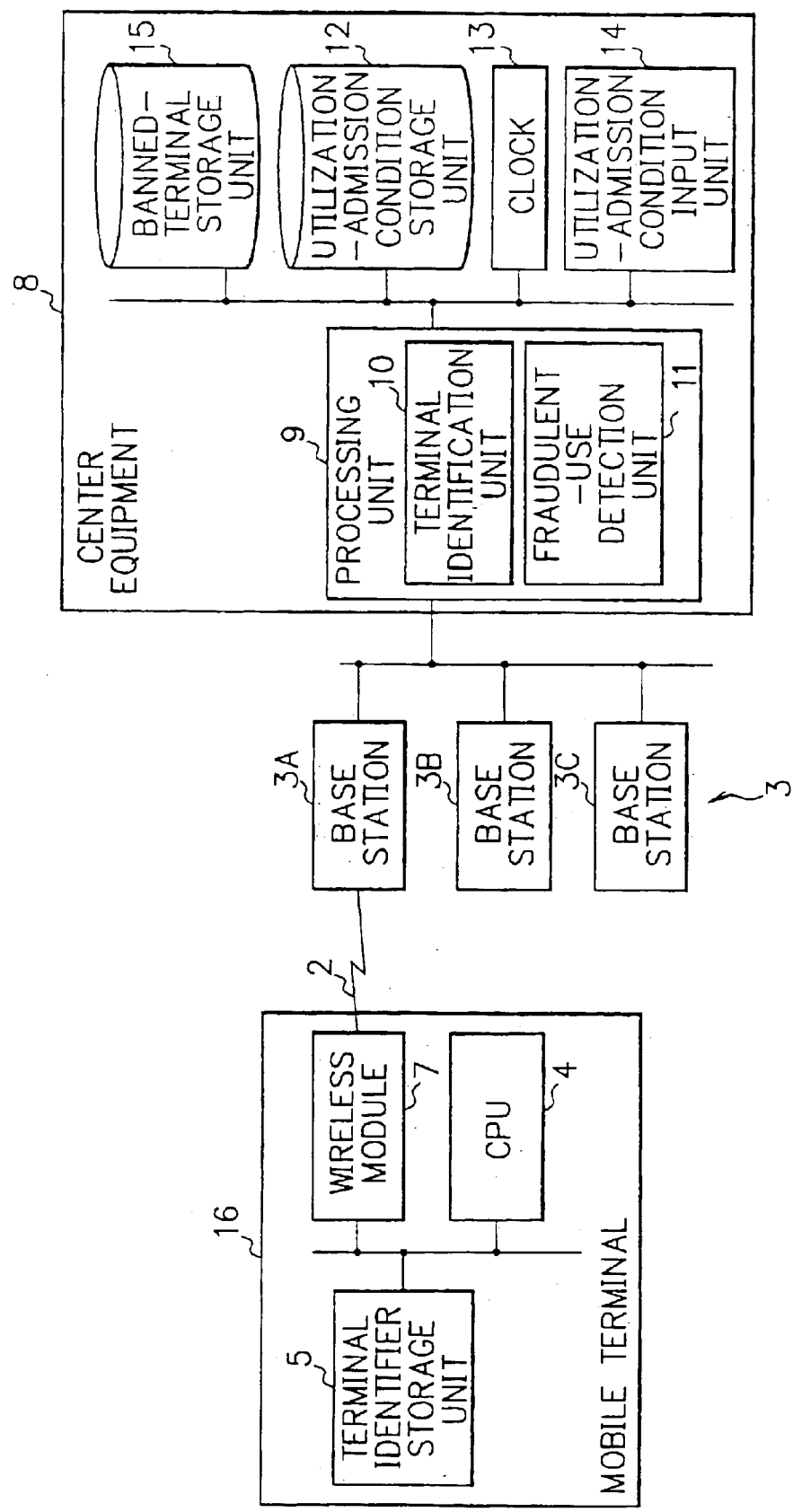
FIG. 3 is a block diagram showing a configuration of a mobile communication system according to a second embodiment of the present invention.

Second Embodiment:

A mobile communication system according to a second embodiment of the present invention has the same structure as that of the first embodiment as described above, excluding the following points. Unlike the mobile terminal 1 of the mobile communication system according to the first embodiment, a mobile terminal 16 of the mobile communication system according to a second embodiment lacks, as shown in FIG. 3, a location detection unit. The mobile communication system according to the second embodiment, however, includes a plurality of base stations 3A, 3B, and 3C. As for other elements constituting the mobile communication system, the system according to the second embodiment is the same in structure as that according to the first embodiment.

Similar to the mobile communication system according to the first embodiment, before a mobile terminal 16 is used, a utilization-admission condition information is input from a utilization-admission condition input unit 14. This information is stored in a utilization-admission condition storage unit 12.

The utilization-admission condition information includes a time-slot information and a location information. The time-slot information is information indicative of a time slot in which each mobile terminal 16 is permitted to be used. The location information is indicative of a geographical location where each mobile terminal 16 is permitted to be used. It should be noted that in the present embodiment the mobile terminal 16 is determined to be located in the vicinity of one of the base stations 3A, 3B, and 3C, with which the terminal 16 has established a connection.

The location information is held in a form that each mobile terminal 16 is permitted to be connected to any one of the base stations 3A, 3B, and 3C. Any one of the base stations 3A, 3B, and 3C permitted to be connected to each mobile terminal 16 is hereinafter referred to as a communication-capable base station.

Figure 4:
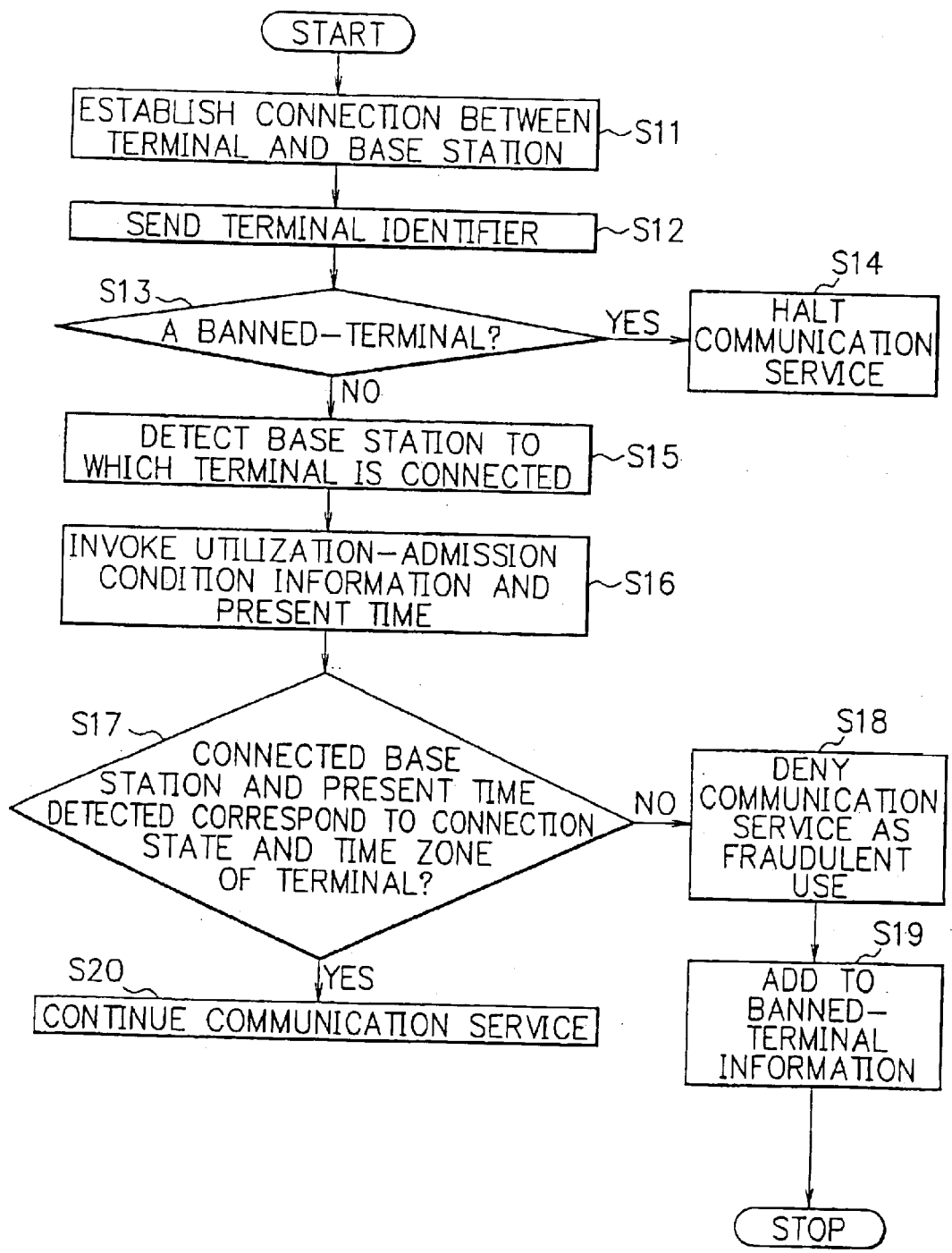
FIG. 4 is a flowchart illustrating the operation of a mobile communication system according to a second embodiment.

FIG. 4 is a flowchart showing the operation of the mobile communication system according to the second embodiment when each mobile terminal 16 is used. Description is made by separating the operation into steps S1 to S20.

In step S11, the mobile terminal 16 is started to be used so as to establish a connection with one of the base stations 3A, 3B, and 3C. The processing goes to step S12 after the terminal 16 has established a connection with the base station 3A. In the step S12, a terminal identifier stored in the terminal-identifier storage unit 5 is sent to the center equipment 8 via the wireless communication network 2 and base station 3A.

In step S13, the processing unit 9 performs collation between a terminal identifier sent from the mobile terminal 16 and a banned-terminal information stored in the banned-terminal storage unit 15. If the terminal identifier from the mobile terminal 16 matches a terminal identifier contained in the banned-terminal information, the processing unit 9 halts a communication service to the terminal 16 in step S14. If not, the processing goes from step S13 to step 15.

In the step S15, a fraudulent use detection unit 11 of the processing unit 9 detects that to which of the base stations 3A, 3B, and 3C, the mobile terminal 16 is connected. The base station connected to the terminal 16 is hereinafter referred to as a connected base station. In the present embodiment, the base station 3A is the connected base station. The processing then goes to step S16.

In the step S16, the processing unit 9 of the center equipment 8 invokes a utilization-admission condition information of the mobile terminal 16 from the utilization-admission condition storage unit 12, by using the terminal identifier sent from the mobile terminal 16. The unit 9 also invokes the present time from the clock unit 13. The present time is the time when the center equipment 8 communicates with the terminal 16. Then the processing of step S17 is executed.

The fraudulent use detection unit 11 makes inquiries in the step S17, about a utilization-admission condition information of the mobile terminal 16, the present time, and the connected base station. If the connected base station and the present time do not respectively correspond to the base station to which the terminal is permitted to be connected and the time slot in which the terminal is allowed to be used, the terminal is considered to be fraudulently used. In this case, the processing goes to step S18.

In the step S18, the processing unit 9 forcibly stops providing the terminal 16 with a communication service. After the step S18, step S19 is executed.

In the step S19, if required, the processing unit 9 adds to a banned-terminal information stored in the banned-terminal storage unit 15 a terminal identifier of the terminal 16 that has been determined to be fraudulently used. From this point onward, the terminal 16 that has been determined to be fraudulently used is prohibited from usage.

If, on the other hand, the connected base station and the present time respectively correspond to the base station to which the terminal 16 is permitted to be connected and the time slot in which the terminal 16 is allowed to be used, the terminal is considered to be fraudulently used. In this case, the processing goes to step S20, where the processing unit 9 provides a communication service for the mobile terminal 16.

Processing steps as shown in steps S11 to S20 are stored in a storage medium (not shown) as computer readable program codes. The mobile communication system according to the second embodiment executes the processings in conformity with these program codes.

Accordingly, the mobile communication system according to the second embodiment, similar to the system according to the first embodiment, prevents the terminal from being fraudulently used. Furthermore, the mobile terminal 16 according to the second embodiment is simplified in structure by eliminating a location detection unit.

Figure 5:
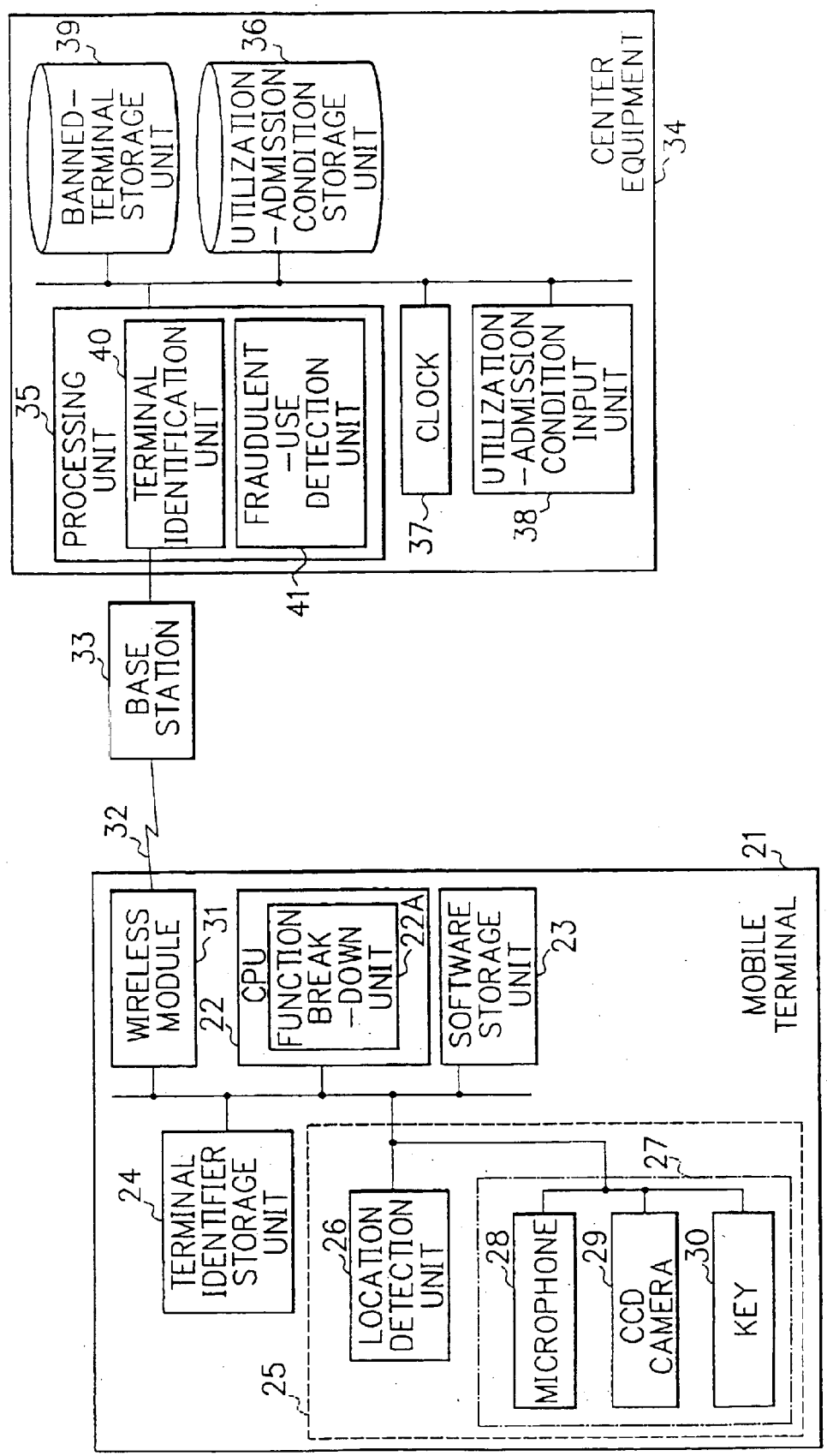
FIG. 5 is a block diagram depicting a configuration of a mobile communication system according to a third embodiment of the present invention.

Third Embodiment:

A mobile communication system according to a third embodiment of the present invention provides a mobile terminal 21 as shown in FIG. 5 that includes a central processing unit (CPU) 22. The CPU 22 is connected to a software storage unit 23 that stores programs the CPU 22 executes. The CPU 22 gives instructions to each part of the mobile terminal 21 according to the programs stored in the software storage unit 23.

The CPU 22 is also connected to a terminal-identifier storage unit 24 that stores a terminal identifier inherent to the mobile terminal 21. The CPU 22 is connected to a utilization-condition detection unit 25 for detecting a condition how the terminal 21 is being used. Utilization condition of the terminal 21 contains a geographical location where the terminal 21 exists and its user attribute.

The utilization-condition detection unit 25 includes a location detection unit 26 and a user-attribute input unit 27, each of which is connected to the CPU 22. The location detection unit 26 detects a position of a terminal where the mobile terminal 21 exists. Attribute of the user who uses the terminal 21 is input to the user-attribute input unit 27. The user attribute includes a voice information on the user, an optical information with respect to the user, and the key operation of the user. The user attribute may be other elements as far as the element can identify the user.

The user-attribute input unit 27 includes a microphone 28 through which a user's voice is input. From the user's voice, the CPU 22 detects voice patterns of the user. The user-attribute input unit 27 further includes a charge coupled device (CCD) camera 29 and a key 30. The CCD camera 29 detects use's fingerprints as the optical information. It is noted that the optical information may be use's facial conformation. The user operates the key 30 in accordance with processing called a key operation. More specifically, the user inputs a password or a personal identification number through the key operation. Microphone 28, CCD camera 29, and key 30 are connected to the CPU 22.

The CPU 22 is also connected to a wireless module 31, to which a base station 33 is linked via a wireless communication network 32. The base station 33 is connected to a center equipment 34 that includes a processing unit 35. This unit 35 contains a terminal identification unit 40 and a fraudulent-use detection unit 41. The center equipment 34 further includes a utilization-admission condition storage unit 36 and a clock unit 37, a utilization-admission condition input unit 38, and a banned-terminal storage unit 39.

The utilization-admission condition storage unit 36 stores information on a utilization-admission condition indicative of a condition with respect to how the mobile terminal 21 is permitted to be used, which is hereinafter referred to as a utilization-admission condition. The utilization-admission condition includes a time slot in which the mobile terminal 21 is permitted to be used, a geographical location where the terminal 21 is permitted to be used, and attribute of the user of the mobile terminal 21 who is permitted to use the terminal when the attribute is input to the user-attribute input unit 27.

The above-mentioned attribute is hereinafter referred to as an admission attribute including voice patterns of the user who is permitted to use the mobile terminal 21 when he or she inputs his or her voice into the terminal 21. The admission attribute further includes fingerprints and a password of the user who is permitted to use the terminal 21 when the fingerprints and password are input to the terminal. To the utilization-admission condition input unit 38, the information on a utilization-admission condition is input. The information is then transmitted to the utilization-admission condition storage unit 36 and stored thereon.

Description will now be given to the operation of the mobile communication system according to the third embodiment. Similar to the system according to the first embodiment, prior to the mobile terminal 21 is used, the utilization-admission condition information is output from the utilization-admission condition input unit 38. The information is then stored in the utilization-admission condition storage unit 36.

Figure 6:
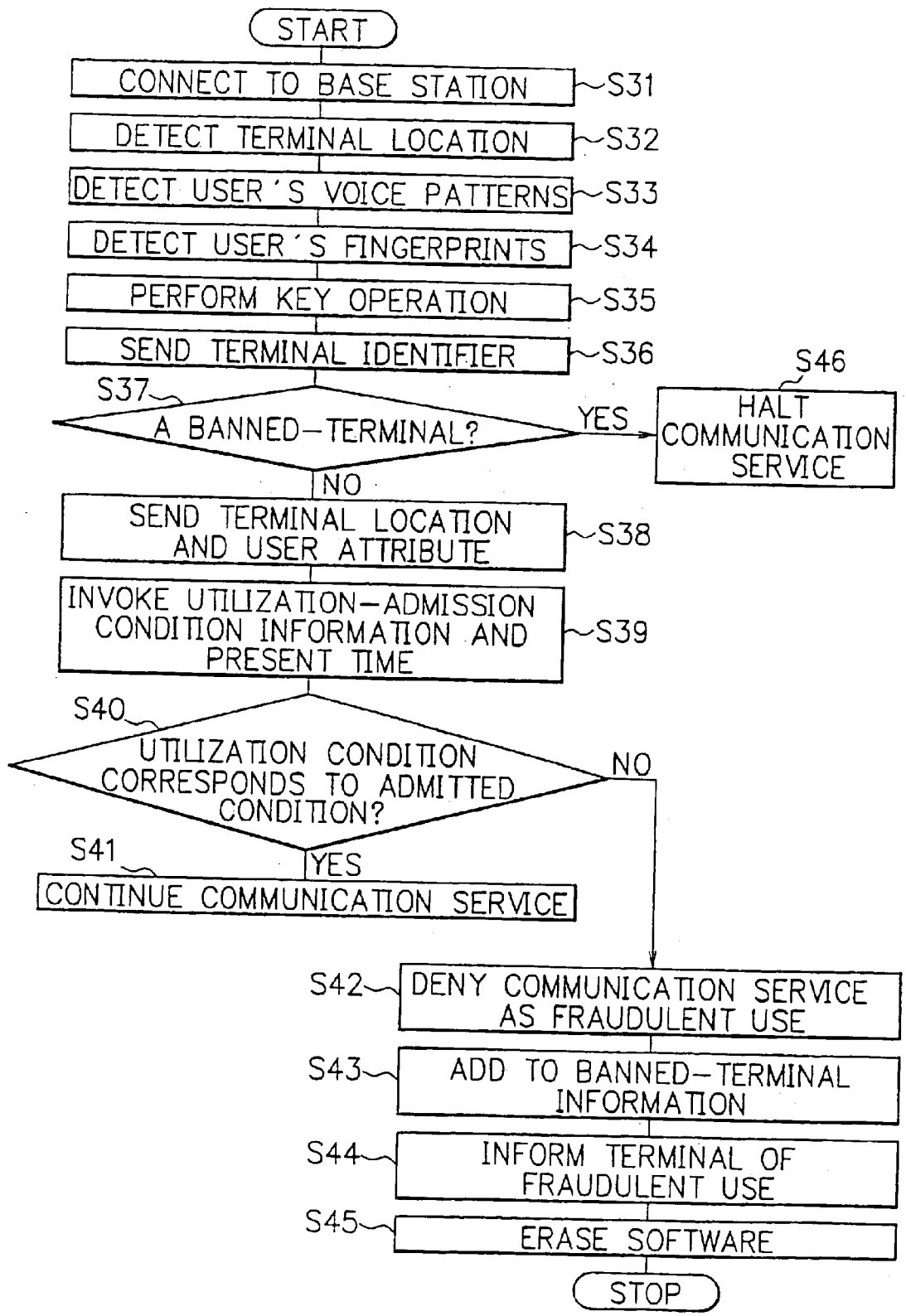
FIG. 6 is a flowchart illustrating the operation of a mobile communication system according to a third embodiment.
Figure 7:
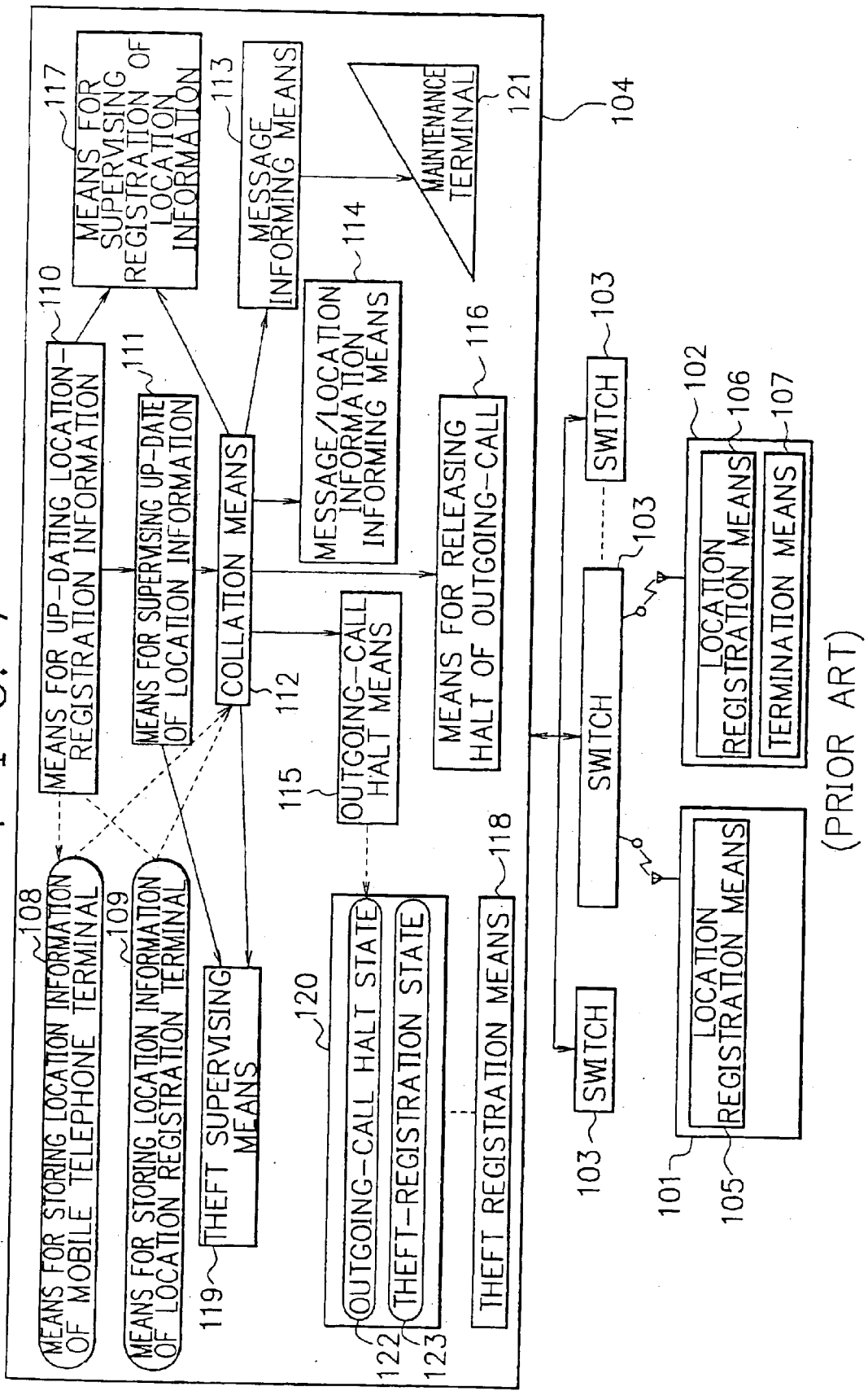
FIG. 7 shows a structure of prior art mobile communication system.

The operation of the mobile communication system according to the third embodiment when the mobile terminal 21 is used, will be described with reference to a flowchart as shown in FIG. 6. Description is made by separating the operation into steps S31 to S46.

In step S31, a terminal user starts using the mobile terminal 21 and a connection is established between the terminal 21 and the base station 33. The processing then goes to step S32. In the step S32, the location detection unit 26 detects the geographical location where the mobile terminal 21 exists. The location detection unit 6 detects the terminal location by using a GPS antenna.

In step S33, a user's voice is input to the microphone 28, the CPU 22 then detects his or her voice patterns from his or her voice. In the next step, step S34, the CCD camera 29 detects user's fingerprints. After the step S34, step S35 is executed, where the user operates the key 30 for inputting a personal identification number.

In step S36, a terminal identifier is sent from the mobile terminal 21 to the center equipment 34 via the wireless module 31, the wireless communication network 32, and the base station 33. The terminal identifier reaches the processing unit 35 in the center equipment 34. With investigation of the identifier, the unit 35 recognizes which of the terminals is the originator.

The processing unit 35 checks in step S37 if the terminal identifier sent from the mobile terminal 21 matches a banned-terminal information stored in the banned-terminal storage unit 39. If match is made, that is, if the terminal identifier from the mobile terminal 21 corresponds to an identifier contained in the banned-terminal information, the processing unit 35 halts a communication service with the terminal 21 in step S46.

If, on the other hand, the terminal identifier from the mobile terminal 21 does not correspond to an identifier contained in the banned-terminal information, step S38 is executed where a terminal location and an attribute of the user are sent from the mobile terminal 21 to the processing unit 35 of the center equipment 34, via the wireless module 31, the wireless communication network 32, and the base station 33. The attribute of the user includes user's voice patterns, user's fingerprints, and his or her personal identification number.

In the next step, step S39, the processing unit 35 of the center equipment 34 invokes from the utilization-admission condition storage unit 36 a utilization-admission condition information associated with the mobile terminal 21, by using the terminal identifier sent from the terminal 21. The processing unit 35 further invokes the present time from the clock 37, which is the time when the mobile terminal 21 communicates with the center equipment 34.

In step S40, the fraudulent-use detection unit 41 compares the utilization-admission condition information with a utilization condition that includes the terminal location detected in the step S32, the present time invoked in the step S39, and the user attributes such as user's voice patterns, user's fingerprints, and key operation by the user detected in the steps S33 to S35. As mentioned above, the user attributes include a personal identification number entered by the user's key operation.

If the utilization condition corresponds to the utilization-admission condition in which each of the terminals is permitted to be used, it is determined that the mobile terminal 21 is not to be fraudulently used. In this case, successive to the step S40, processing of step S41 is executed. In the step S41, the processing unit 35 performs continuation of a communication service with the mobile terminal 21.

However, if the utilization condition does not correspond to the utilization-admission condition, the mobile terminal 21 is determined to be fraudulently used, therefore, the processing unit 35 forcibly halts a communication service with the mobile terminal 21.

In the next step, step S43, the processing unit 35 adds, as required, to the banned-terminal information stored in the banned-terminal storage unit 39 a terminal identifier of the terminal 21 that has been determined to be fraudulently used. After this, the terminal 21 determined to be fraudulently used is prohibited from usage.

In step S44, the processing unit 35 issues to the mobile terminal 21, where necessary, a signal indicative of fraudulent use, via the base station 33 and wireless communication network 32. The signal indicative of fraudulent use is used to inform the terminal 21 of the fact that the terminal 21 has been fraudulently used.

The CPU 22 of the mobile terminal 21 receives the above-mentioned signal thereafter a function break-down unit 22A of the CPU 22 destroys a software stored in the software storage unit 23. More specifically, the function break-down unit 22A erases or deletes the software stored in the software storage unit 23.

The processings corresponding to the steps S21 to S45 are stored in a storage medium (not shown) as program codes. The mobile communication system according to the third embodiment operates in accordance with the stored program.

By adopting the mobile communication system according to the third embodiment, it is possible to prevent fraudulent use of the terminal, similar to the system according to the first embodiment. It should be noted that the processings corresponding to the steps S43 to S45 in FIG. 6 may be omitted.

It is also possible for the CCD camera 29 to detect use's facial conformation. In this case, user attribute includes the use's facial conformation, and furthermore, the admission attribute contained in the utilization-admission condition includes facial conformation of the user who will be permitted to use the mobile terminal 21.

In the third embodiment, the utilization-condition detection unit 25 can exclude either the location detection unit 26 or the user-attribute input unit 27. If the location detection unit 26 is omitted, the utilization condition does not include a terminal location. At the same time, the utilization-admission condition excludes the location of the mobile terminal 21 where the terminal 21 will be permitted to be used.

If the user-attribute input unit 27 is eliminated, the utilization condition does not include user attribute. Further, the utilization-admission condition excludes attribute of the user who will be permitted to use the mobile terminal 21.

The user-attribute input unit 27 may exclude at least one or more of the microphone 28, the CCD camera 29, and the key 30. With the microphone 28 being excluded, the user attribute also excludes user's voice patterns. Therefore, the admission attribute contained in the utilization-admission condition excludes voice patterns of the user who will be permitted to use the mobile terminal 21.

If the CCD camera 29 is excluded, user attribute also excludes user's fingerprints. In this case, the admission attribute contained in the utilization-admission condition excludes fingerprints of the user who will be permitted to use the mobile terminal 21.

With the key 30 being excluded, user attribute also excludes key operation by the user, especially, a personal identification number which will be entered via the key. In this case, the admission attribute contained in the utilization-admission condition excludes the key operation, particularly the personal identification number, by which the mobile terminal 21 is permitted to be used.

It may be possible for the function break-down unit 22A to physically break down the functions of the mobile terminal 21, when the function break-down unit 22A knows by the signal indicative of fraudulent use of the terminal 21, of the fact that the terminal has been fraudulently used. In this case, the functions of the mobile terminal 21 are destroyed to the extent that the terminal is unable to communicate with the base station 33 and center equipment 34.

It may also be possible for the function break-down unit 22A to perform physical break down on the CPU 22 and wireless module 31, including to destroy electronic components such as transistors in the wireless module 31, or to cut down wirings in the CPU 22 and wireless module 31.

It may be possible for the function break-down unit 22A when the unit 22A knows fraudulent use of the terminal 21 by the signal indicative of the fraudulent use of the terminal 21, to erase a terminal identifier stored in the terminal-identifier storage unit 24. This disables the mobile terminal 21 to communicate with the base station 33 and center equipment 34.

The mobile communication system according to the third embodiment, similar to the system of the second embodiment, mmay have a plurality of base stations, where the location of the terminal 21 is considered to be the location of one of the base stations 33 to which the terminal 21 is connected.

If the mobile communication system according to the third embodiment has a plurality of base stations as mentioned above, the system can find out a lost or missing mobile terminal. This processing is based on the operation that the mobile terminal 21 periodically communicates with any of the base stations 33, and executed as follows.

User who has lost his or her mobile terminal 21 or whose terminal has been stolen claims a find out of the terminal to the center equipment 34, if necessary. The center equipment 34 then makes inquiries all of the base stations 33 about a communication state with the mobile terminal 21. The center equipment 34 thereafter selects a base station that is being communicating with the mobile terminal 21, as a location-detection base station. From this selection, the center equipment 34 determines that the terminal of interest is located in the vicinity of the location-detection base station.

After that, the center equipment 34 informs the user of the location of the terminal, that is, the use's terminal is used or left uncontrolled in the neighborhood of the location-detection base station. Therefore, it is possible to find out a lost or missing mobile terminal, and the user is informed of the location of the terminal. It should be noted that this processing is executed according to program codes stored in a storage medium.

Accordingly, the mobile communication system of the present invention prevents fraudulent use of the terminal. Furthermore, the mobile communication system of the present invention is capable of detecting the location of the terminal that has been lost by the user, or the location of the stolen terminal.

What is claimed is:

1. A mobile terminal comprising:
   a communication means for communicating with a fixed station; and
   a first detection means for detecting a utilization condition indicative of a state of said mobile terminal that is being used,
   wherein said communication means transmits said utilization condition to said fixed station.

2. A mobile terminal according to claim 1, wherein said first detection means includes a second detection means for detecting a terminal location where said mobile terminal exists, said terminal location being included in said utilization condition.

3. A mobile terminal according to claim 1, wherein said first detection means includes a third detection means for detecting attribute of a user who uses said mobile terminal, said attribute being included in said utilization condition.

4. A mobile terminal according to claim 3, wherein said third detection means includes a fourth detection means for detecting user's voice patterns, said voice patterns being included in said attribute.

5. A mobile terminal according to claim 3, wherein said third detection means includes a fifth detection means for detecting an optical information associated with said user, said optical information being included in said attribute.

6. A mobile terminal according to claim 3, wherein said third detection means includes a key, said attribute including user's operation performed with said key.

7. A mobile terminal according to claim 6, wherein said user's operation includes the operation for inputting a personal identification number.

8. A mobile terminal according to claim 1, further comprising a break-down means for breaking down the functions of said mobile terminal, wherein said communication means receives a signal from said fixed station, and wherein said break-down means breaks down the functions of said communication means in response to said signal.

9. A mobile terminal according to claim 8, wherein said communication means includes a software storage means for storing a software whereby said communication means communicates with said fixed station, and wherein said break-down means breaks down said software in response to said signal.

10. A mobile terminal according to claim 8, wherein said communication means includes a storage means for storing a terminal identifier and sends said terminal identifier to said fixed station, and wherein said break-down means breaks down said terminal identifier in response to said signal.

11. A mobile terminal according to claim 8, wherein said break-down means physically breaks down the functions of said communication means in response to said signal.

* * * * *